United States Patent
Cordeiro et al.

(10) Patent No.: US 9,025,578 B2
(45) Date of Patent: May 5, 2015

(54) MAC PROTOCOL FOR MULTI-CHANNEL WIRELESS NETWORKS

(75) Inventors: Carlos Cordeiro, Portland, OR (US); Bong-Jun Ko, Hawthorne, NY (US); Kiran Challapali, New City, NY (US)

(73) Assignee: Koninklijke Philips N.V., Eindhoven (NL)

( * ) Notice: Subject to any disclaimer, the term of this patent is extended or adjusted under 35 U.S.C. 154(b) by 636 days.

(21) Appl. No.: 12/937,025

(22) PCT Filed: Apr. 24, 2009

(86) PCT No.: PCT/IB2009/051608
§ 371 (c)(1),
(2), (4) Date: Oct. 8, 2010

(87) PCT Pub. No.: WO2009/130650
PCT Pub. Date: Oct. 29, 2009

(65) Prior Publication Data
US 2011/0032912 A1    Feb. 10, 2011

Related U.S. Application Data

(60) Provisional application No. 61/161,933, filed on Mar. 20, 2009, provisional application No. 61/047,905, filed on Apr. 25, 2008.

(51) Int. Cl.
*H04J 3/00*         (2006.01)
*H04W 48/10*    (2009.01)
*H04W 88/18*    (2009.01)

(52) U.S. Cl.
CPC ............ *H04W 48/10* (2013.01); *H04W 88/182* (2013.01)

(58) Field of Classification Search
None
See application file for complete search history.

(56) References Cited

U.S. PATENT DOCUMENTS 6,404,756 B1   6/2002  Whitehill
2002/0067704 A1*  6/2002  Ton ................................ 370/329

(Continued)

FOREIGN PATENT DOCUMENTS

EP    1246487 A2    10/2002
EP    1737162 A1    12/2006

(Continued)

OTHER PUBLICATIONS

Hiertz G R et al., "IEEE 802.11-05/0605r22-IEEE 802.11s MAC Sublayer Functional Description, Mesh WLAN Security", Internet Citation, [Online] Jun. 1, 2005, XP002401117.

(Continued)

*Primary Examiner* — Anez Ebrahim
(74) *Attorney, Agent, or Firm* — Larry Liberchuk

(57) ABSTRACT

A distributed coordination of a wireless network operating on different channels is provided by dispatching a device on each 'home' channel to regularly visit other 'foreign' channels to propagate and listen to broadcast information on these channels. The information in the broadcast packets transmitted on the home channel is relayed to the devices on the foreign channels by the dispatched device, as a 'proxy device' that operates on behalf of the other devices in the home channel. In a preferred embodiment, various aspects of this proxy process are optimized to reduce overhead and delays. Each channel is configured to distinguish home devices from foreign devices, to avoid contention between home and foreign devices. Acquired beacon slots on foreign channels are reserved to facilitate returning proxy devices. At the home channel, an anchor device alerts other devices of the proxy device's temporary absence and preserves the proxy device's beacon slot on the home channel.

14 Claims, 3 Drawing Sheets

(56) References Cited

U.S. PATENT DOCUMENTS

| | | | | |
|---|---|---|---|---|
| 2003/0214967 | A1* | 11/2003 | Heberling | 370/437 |
| 2004/0203765 | A1* | 10/2004 | Das et al. | 455/445 |
| 2006/0089141 | A1* | 4/2006 | Ho et al. | 455/436 |
| 2006/0286984 | A1* | 12/2006 | Bonner | 455/445 |
| 2007/0115883 | A1* | 5/2007 | Narayanan et al. | 370/331 |
| 2008/0117864 | A1* | 5/2008 | Wu et al. | 370/329 |
| 2010/0220665 | A1* | 9/2010 | Govindan et al. | 370/329 |

FOREIGN PATENT DOCUMENTS

| | | |
|---|---|---|
| WO | WO2007031960 A2 | 3/2007 |
| WO | WO2007054874 A2 | 5/2007 |
| WO | WO2008068711 A1 | 6/2008 |

OTHER PUBLICATIONS

S. Krishnamurthy et al., "Time-efficient distributed layer-2 auto-configuration for cognitive radio networks", Computer Networks, Elsevier Science Publishers B.V., Amsterdam, NL, vol. 52, No. 4, Nov. 23, 2007, pp. 831-849, XP022456229.

Carlos Cordeiro et al., "A Beacon-based Proposal to IEEE 802.22.1", IEEE 802.22-06/0130r2 Working group, Sep. 2006.

J. Zhao et al., "Distributed Coordination in Dynamic Spectrum Allocation Networks", IEEE International Symposium on Dynamic Spectrum Access Networks (IEEE DySPAN), Nov. 2005.

H. W. So et al., "McMAC: A Multi-Channel MAC Proposal for Ad-Hoc Wireless Networks", Technical Report, Apr. 2005.

\* cited by examiner

MAC PROTOCOL FOR MULTI-CHANNEL WIRELESS NETWORKS

This application claims the benefit of U.S. Provisional Application No. 61/047,905 filed on Apr. 25, 2008.

This invention relates to the field of communications and, in particular, to a method and system for integrating wireless networks operating on different channels.

With the promise of improved efficiency of spectrum usage, improved performance, and low cost/complexity, multi-channel media access control (MC-MAC) protocols that are capable of dynamically managing multiple frequency channels are receiving increasing attention. Of particular note, opportunistic spectrum usage using agile/cognitive radios can be expected to substantially increase multi-channel availability in many environments.

Coupled with the demand for better spectrum reuse and enhanced data rates, there has been an increase in the development of MAC protocols able to exploit multiple frequency channels in a highly dynamic fashion, using the single transceiver that is typically available in each device. Multi-channel MAC protocols can provide performance advantages in reducing collisions and allowing more simultaneous transmissions and, hence, more efficient spectrum utilization by partitioning a common network into a plurality of single-channel networks. In this manner, devices in the common network are able to communicate concurrently in different channels without interfering with each other. Of particular advantage, the partitioning can be designed to support traffic having quality of service (QoS) requirements.

The IEEE 802.11 MAC (Media Access Control) standards for wireless communications have been designed for operating multiple devices in a single frequency channel. The 802.11a and 802.11b physical layer support dynamic switching among multiple frequencies, but the 802.11 MAC implementations do not dynamically use multiple frequency channels to achieve increased bandwidth and spectrum utilization within a common logical network. A common multi-channel network may be, for example, a home network, with different channels used to handle different tasks (audio-video transfers, data transfers, command and control, and so on). In like manner, a company network may include different channels for different departments.

An important design consideration in wireless multi-channel communications is how to allow for devices on different channels to coordinate and share information about the network, such as a neighbor node list, channel reservation status, synchronization clock, and so on, while still providing effective and efficient communication and spectral utilization across the channels. A variety of forms of frequency hopping techniques have been proposed to improve spectrum utilization within a common network, but, depending on the embodiment, frequency hopping often leads to protocol design problems such as support for broadcasting and multicasting, device discovery latency, and so on. Of particular note, most frequency hopping techniques do not accommodate the aforementioned opportunistic spectrum usage, wherein channel availability changes over time.

In many wireless networks, network control information is often carried on special packets called beacon packets (or simply, beacons). Beacons are typically broadcast periodically by network devices. Some examples of the information that these beacon packets contain are: network identifier, neighboring node list per channel, synchronization timer, capacity of nodes, channel reservation status, and so on.

By transmitting or listening to these broadcast beacon packets, network devices can perform several operations related to network management, such as synchronizing the timer, learning and propagating channel reservation status, etc. In single channel wireless networks, the transmission mechanism of beacon packets is relatively simple: beacons are periodically transmitted by network devices at scheduled times, either using TDMA (time division multiple access or time-slot reservation) or CSMA (contention-based multiple access). Because beacon packets are broadcast packets, network devices in a single channel wireless network can easily obtain all of the network management information by listening to the channel medium over time.

However, in multi-channel wireless networks, where networks devices can be tuned to different channels, broadcasting a beacon packet to all of the channels on a multi-channel network becomes a challenging problem because a beacon packet transmitted on one channel will not be heard by devices on other channels.

The most common technique for sharing information among devices on a multi-channel network is to use a 'rendezvous channel', at which devices from each channel gather at predetermined times to exchange data. However, the use of a dedicated common rendezvous channel has a significant number of limitations.

In addition to the overhead and resources required to maintain a separate rendezvous channel, the extent of such a common network is limited. That is, all of the rendezvousing devices from all of the channels must be within communication range of each other.

Participation in forming a common logical network using a rendezvous channel may also be sub-optimal. If the amount of information being shared between the various channel pairs is significantly unbalanced, the overhead required to participate in the rendezvous channel may be disproportionately high for devices in the channel having a relatively large amount of shared communications.

Additionally, in shared spectrum environments, such as the aforementioned agile/cognitive radio environment, wherein networks are established on 'currently unused' bands on a non-interference basis, and must depart the band as soon as a higher-priority user is detected, unless the rendezvous channel is continually operated, an efficient technique for detecting that the rendezvous channel must be relocated and notifying all of the devices in the network on various channels that the rendezvous channel has been relocated is difficult to achieve.

It would be advantageous to allow single-channel devices to operate on a variety of frequency channels to make efficient use of the available spectrum and improve the overall bandwidth of the network. It would also be advantageous to be able to integrate existing wireless networks operating on different frequency channels to form a logical network comprised of these multiple physical networks.

These advantages, and others, can be realized by a distributed coordination of wireless networks operating on different channels. Devices on different channels are configured to propagate and listen to broadcast information. A multi-hop communication is introduced between devices on different channels, where the multi-hop communication is incurred by the separation between devices in the channel space, not in the geographic space. The information in the broadcast packets transmitted on one channel is relayed to the devices on other channels by devices that are temporarily dispatched to other channels to act as 'proxy devices' that operate on behalf of the other devices in the same channel. In a preferred embodiment, various aspects of this proxy process are optimized to reduce overhead and delays.

To facilitate efficient operation of proxy devices in the other channels, devices in each channel are configured to distinguish proxy devices and to provide dedicated resources for these proxy devices. In a preferred embodiment, one or more beacon slots are allocated for use by foreign proxy devices. In this manner, the delays typically associated with competing with devices in the foreign sub-network for a beacon slot can be avoided.

To minimize the time required to synchronize with devices on a foreign channel, each proxy device is configured to secure status information associated with the foreign channel, including the current timing parameters of the foreign channel, and to communicate this status information to the other devices on the home channel when it returns to the home channel. In this manner, a subsequently dispatched proxy device from the home channel will avoid the delays typically associated with discovering the timing parameters of a foreign channel. If a beacon slot is allocated for each identified foreign channel, the proxy device is also configured to communicate the slot identification to the devices on the home channel, thereby avoiding the delays typically associated with obtaining an allocation of a beacon slot.

While the selected device is absent from its home channel, an anchor device on the home channel is configured to handle traffic directed to the dispatched proxy device, either by notifying the sender of the temporary absence of the dispatched proxy device, or by operating as a store-and-forward device for temporarily holding the traffic until the dispatched proxy device returns. In this manner, the delay normally associated with re-registering a returning device on a given channel and re-establishing routing to the device is avoided.

These features allow for robust and distributed coordination of multiple frequency channels, support for broadcast/multicast over multiple channels, and enable the implementation of a number of other schemes. Finally, since the proposed approach is fully distributed, a network can survive through periods of channel unavailability which can be due to, for example, the appearance of higher priority users.

This multi-channel beacon period structure together with these foreign beacon slots provides a complete support to distributed multi-channel coordination of devices belonging to different channels, without relying on a common rendezvous channel. In addition, through the information contained in each beacon packet, devices can quickly learn neighboring information, synchronization across multiple channels is supported, device discovery is simplified, and spectral utilization is maximized.

The invention is explained in further detail, and by way of example, with reference to the accompanying drawings wherein.

Throughout the drawings, the same reference numeral refers to the same element, or an element that performs substantially the same function. The drawings are included for illustrative purposes and are not intended to limit the scope of the invention.

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail.

Although the principles presented herein are particularly well suited for operating a single network over a variety of channels, the invention is not limited to a single network. Each of the channels, for example, may be used by a different network, and the techniques presented herein can be used to facilitate communications among these different networks. For ease of reference, except when required by the context, a distinction between a multi-channel network and a plurality of single-channel or multi-channel networks is not made, because the general principles of the invention are applicable to each.

Figure 1:
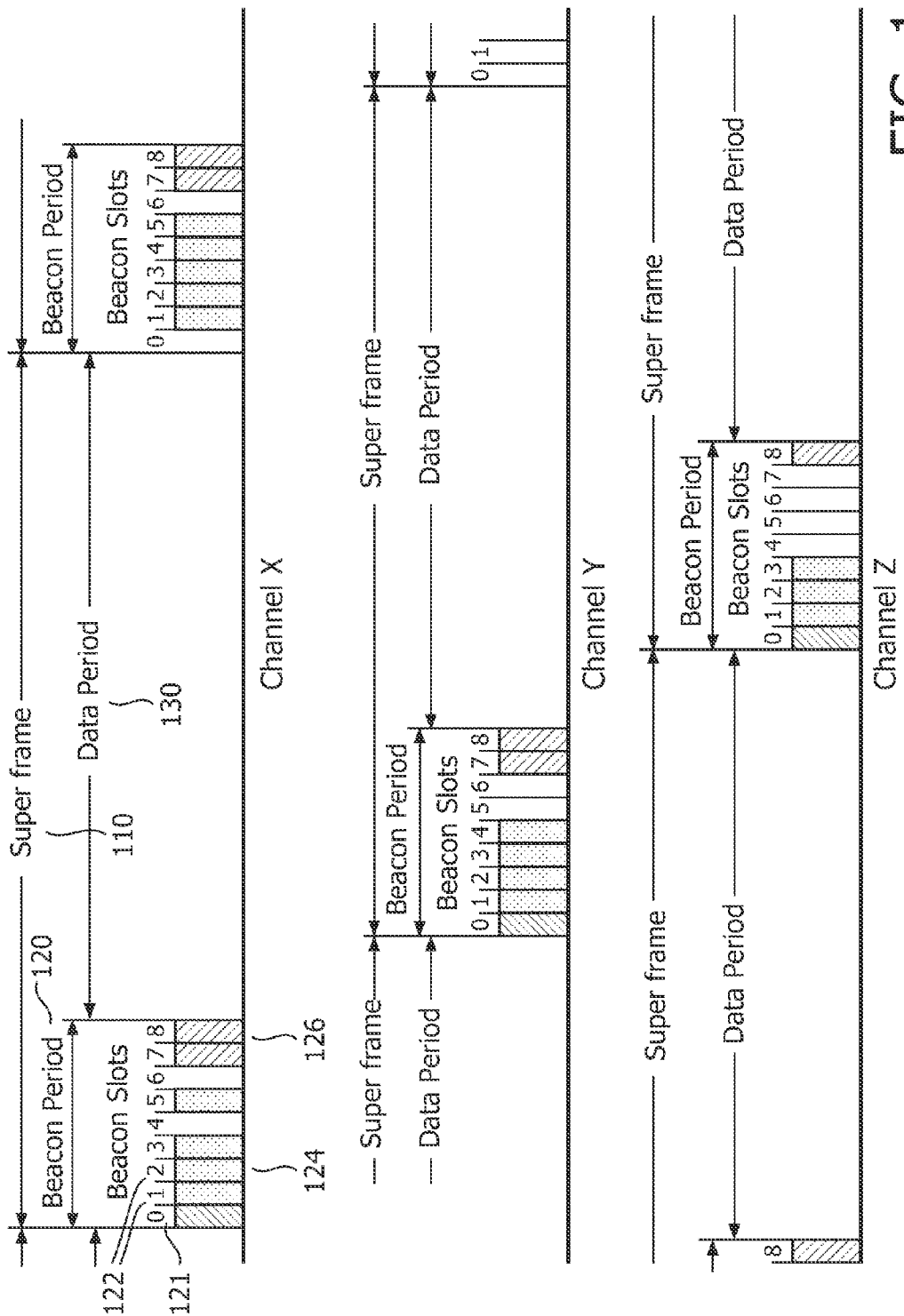
FIG. 1 illustrates an example timing diagram of a multiple-channel network in accordance with aspects of this invention.

FIG. 1 illustrates an example timing diagram of a beacon-oriented protocol for multiple channels X, Y, and Z. During a beacon period 120 of each super frame 110 of communication on each channel, devices on the channel transmit beacon signals on acquired beacon slots 121, 122. After a device initiates communications on the channel by broadcasting a beacon signal at a first beacon slot 121, the beacon slots 122 are generally acquired using semi-contention based access. A new device monitors a beacon period 120 to identify a 'last' used beacon slot, and at the next superframe, transmits its beacon signal at the next slot after the last used slot. If multiple new devices transmit during the same next slot, a conflict results and the contending devices 'back off' and try to communicate with a different delay from the beginning of the slot time. A device retains its slot position for as long as it sends a beacon signal within the slot period. Procedures are provided to have the devices shift down in slot position when a gap is detected in lower position slots over a number of super frames, indicating that a device has abandoned its acquired slot.

The beacon signal is used to announce information related to the device, including its current status. The beacon signal in the first beacon slot 121 may also include information regarding the status of the channel, such as the number of acquired slots, and so on. If a device has a message to send, the beacon signal will also include an identification of the intended destination, advising the destination device to monitor transmissions during the data period to receive the transmitted message. Devices that are not scheduled to send or receive messages during the data period can enter a 'sleep' mode to conserve power until the next beacon period.

As used herein, the term 'home device' is used to refer to a device that routinely operates on a given channel, and the term 'home channel' is used to refer to the channel upon which a given device routinely operates. In like manner, the term 'foreign device' is used to refer to a device that does not routinely operate on a given channel, and the term 'foreign channel' is used to refer to a channel upon which a given device does not routinely operate. The term 'message' generally refers to a set of data that is expressly communicated from a source to a destination, while 'data' is the more general term that may include messages, beacon information, status information, and so on.

In accordance with an aspect of this invention, to integrate the channels X, Y, Z, a home device is temporarily dispatched to act as a proxy for the home channel on each foreign channel. Different home devices may be dispatched at different times, to avoid having a single device incur the entire burden for providing this proxy service.

As a proxy, the dispatched device is configured to communicate data from or to its home channel to and from the foreign channel, using a store-and-forward technique of receiving and storing data from one channel, then transmitting the stored data to the other channel when it arrives at the other channel.

Optionally, because each channel dispatches a proxy to each other channel, providing a bilateral arrangement, the proxy devices may be configured to handle only one direction of traffic flow, such as data from the foreign channel to its home channel. In this arrangement home devices having messages to send to a foreign channel merely wait until the proxy from that channel arrives on the home channel.

Similarly, if the proxy is configured to handle only traffic from the home channel to the foreign channel, once the foreign channel is made aware of the home channel, a home device need not be dispatched to that foreign channel until and unless there is data that needs to be transmitted to the foreign channel, or as needed to keep the foreign device aware of the home device. This approach also makes the process of deciding which home device to dispatch as proxy straightforward: any device having messages to send to a foreign channel is dispatched as the next proxy to that channel, and remains the proxy for periodic refreshes to the foreign channel until another device has messages to send to the foreign channel.

In a network of substantial size, the overhead associated with registering on a foreign channel and re-registering with the home channel could render this proxy technique impractical, or at best, highly inefficient, particularly if the dispatch duration for each proxy visit is kept brief. Accordingly, a number of techniques are used in a preferred embodiment to minimize this overhead.

In accordance with an aspect of this invention, each channel X, Y, Z is configured to distinguish between home devices and foreign devices, and, in doing so, is able to reduce the amount of contention that a foreign proxy device faces with each visit. In a preferred embodiment, the beacon slots provided to home devices are segregated from the beacon slots provided to proxy devices. Generally, the number of foreign channels is substantially fewer than the number of home devices and, therefore, the contention among foreign channels will be substantially less with this segregation.

Additionally, because the number of foreign channels can be expected to be fairly stable, in a preferred embodiment of this invention, the allocation of a beacon slot to a foreign channel is significantly more persistent than the allocation among home devices. That is, when gaps occur in foreign beacon slots, when the proxy device returns to its home channel, it is not eliminated unless the absence is for an extended period. In this manner, an arriving proxy device can immediately announce its presence by beaconing in its previously acquired slot, without re-registering onto the channel, and without encountering contention.

In like manner, when a home device leaves the home channel to be a proxy device on a foreign channel, its beacon slot is preserved for an extended period, thereby avoiding delays upon return due to re-registration on the home channel and delays due to contention. Preferably, the aforementioned procedure for filling gaps in the beacon period is suspended whenever a home device is acting as a proxy device, so that its slot position is maintained while it is absent.

In a preferred embodiment, the segregation between home devices and foreign proxy devices is maintained by having the home devices contend for lower ordered slot positions 124, and foreign devices contend for upper order slot positions 126, illustrated by the darker shadings in FIG. 1. Depending upon the particular environment, a maximum number of foreign slot positions may be set; otherwise, slots may be acquired on a first-come, first-served basis among both home and foreign devices until no empty slots remain.

In accordance with another aspect of this invention, when a home device is used as a proxy device to a foreign channel, another home device acts as an 'anchor' device to represent the proxy device while it is absent. In one embodiment, the anchor device periodically sends a beacon signal at the proxy device's acquired beacon slot to assure that the slot is not determined to have been abandoned. The beacon signal preferably includes a 'temporarily unavailable' status indicator. By maintaining this beaconing on the proxy device's beacon slot on the home channel, existing routing table entries and other configuration parameters are not affected by the proxy device's temporary absence, thereby avoiding the overhead associated with updating such configuration data.

Alternatively, because all devices are expected to monitor each beacon signal, the proxy device's temporary absence can be announced in the anchor device's beacon signal.

In another embodiment, instead of announcing that the proxy device is temporarily unavailable, the anchor device may be configured to receive messages addressed to the proxy device, and stores the messages until the proxy device returns. In a preferred embodiment, the anchor device acts as a router, and does not acknowledge receipt on behalf of the proxy device, thereby avoiding data integrity issues if the proxy device does not return, or if the anchor device is otherwise unable to forward the messages to the proxy device when it returns.

Figure 2:
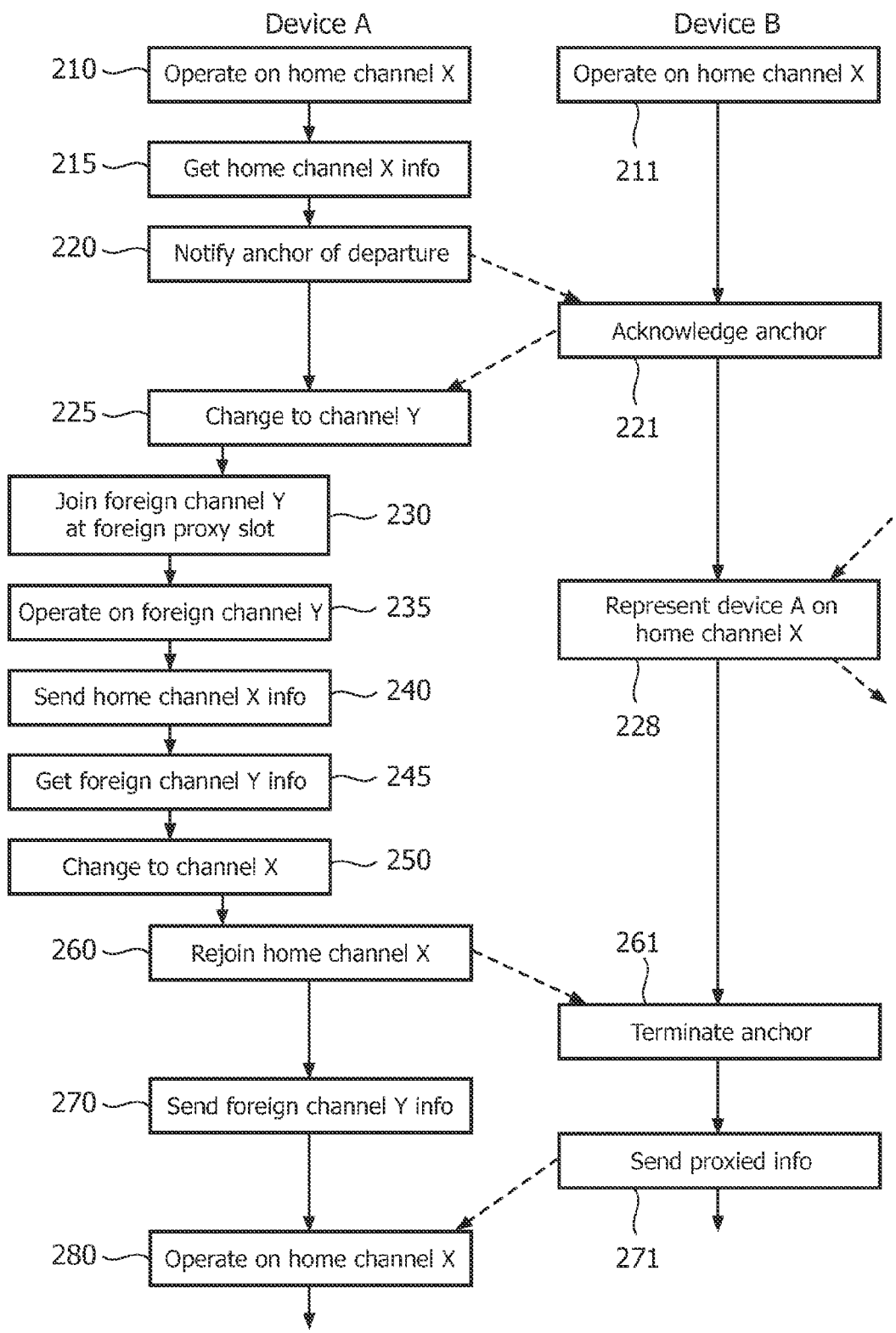
FIG. 2 illustrates an example flow diagram for distributed coordination of a multiple-channel network in accordance with aspects of this invention.

FIG. 2 illustrates an example flow diagram for providing proxy services for a home channel. Device A is a home device in a home channel X that is to provide the proxy service to a foreign channel Y, and device B is a home device that is to provide anchor services. Both devices A and B are initially operating on the home channel X at 210, 211.

At 215, device A obtains whatever information from the home channel it is expected to convey to the foreign channel, and notifies device B that it needs an anchor, at 220. Preferably, device B acknowledges its role as anchor at 221, and device A changes to channel Y upon receipt of this acknowledgement at 225, and device B begins its role of representing device A on the home channel at 228.

At 230 device A joins the foreign channel using one of the foreign beacon slots (126). If this is the first time a device from the home channel is joining the foreign channel, it acquires the next available foreign beacon slot. In the example of FIG. 1, this would be the next prior slot to the last acquired foreign beacon slot. In a preferred embodiment, because the proxy devices are not expected to be continually operating on the foreign channel, if the foreign channels are configured to preserve acquired proxy slots, one of the foreign devices announces the last acquired foreign beacon slot, typically at the first beacon period.

If this is a return visit to the foreign channel, and foreign channels are configured to preserve acquired proxy slots, the proxy device merely announces its presence by beaconing in the previously acquired proxy slot for device A's home channel. As discussed further below, when a proxy device returns to the home channel, it broadcasts status information related to the foreign channel, including, for example, an identification of the acquired proxy slot.

At 235 device A commences operation on the foreign channel Y. At 240 and 245, device A sends the home channel data and receives the foreign channel data, if any, respectively. Although illustrated as single sequential steps for this data transfer, one of skill in the art will recognize that this transfer will generally occur as a series of bidirectional transfers, as required. In addition to explicit message transfers from the foreign channel, a proxy device also gathers status information regarding the foreign channel, including timing information, slot assignment, and so on.

After the data transfer is completed, device A changes its channel back to channel X at 250, and rejoins the home channel at 260. Because device B has represented device A on the home channel during device A's absence, device A is able to rejoin the channel with minimal delay. The only contention that device A will encounter is device B's sending of beacon signals on device A's behalf Preferably, device B does not continuously send a beacon signal in device A's slot, and therefore this contention will be minimal.

Upon rejoining the home channel, device A communicates the data it obtained from the foreign channel, including the aforementioned status information, at 270, and continues routine operation on the home channel at 280. The status information includes, as noted above, timing information and proxy slot information, such as the acquired proxy slot number, if the corresponding foreign channel preserves proxy slot assignments. Based on the foreign channel status information, the home device may, for example, synchronize its clock, propagate channel monitoring information, and learn about devices reachable via the foreign channel.

The devices on the home channel may use the timing information from the foreign channel to adjust the superframe timing on the home channel to reduce the cycle time experienced by the proxy devices. For example, in FIG. 1, because the channel timings are well distributed, a proxy device can switch from one channel to another in less than a full superframe duration. If the beacon periods were overlapping, waiting for the other channels beacon period could take a full superframe duration or more. Additionally, with some gap between each non-overlapping beacon period, a proxy device could be enabled to monitor the status of all of the foreign channels while still maintaining its own beacon signaling.

When device B detects device A's presence, it terminates its anchor role, at 261, and communicates any data that it may have received on device A's behalf at 271.

Figure 3:
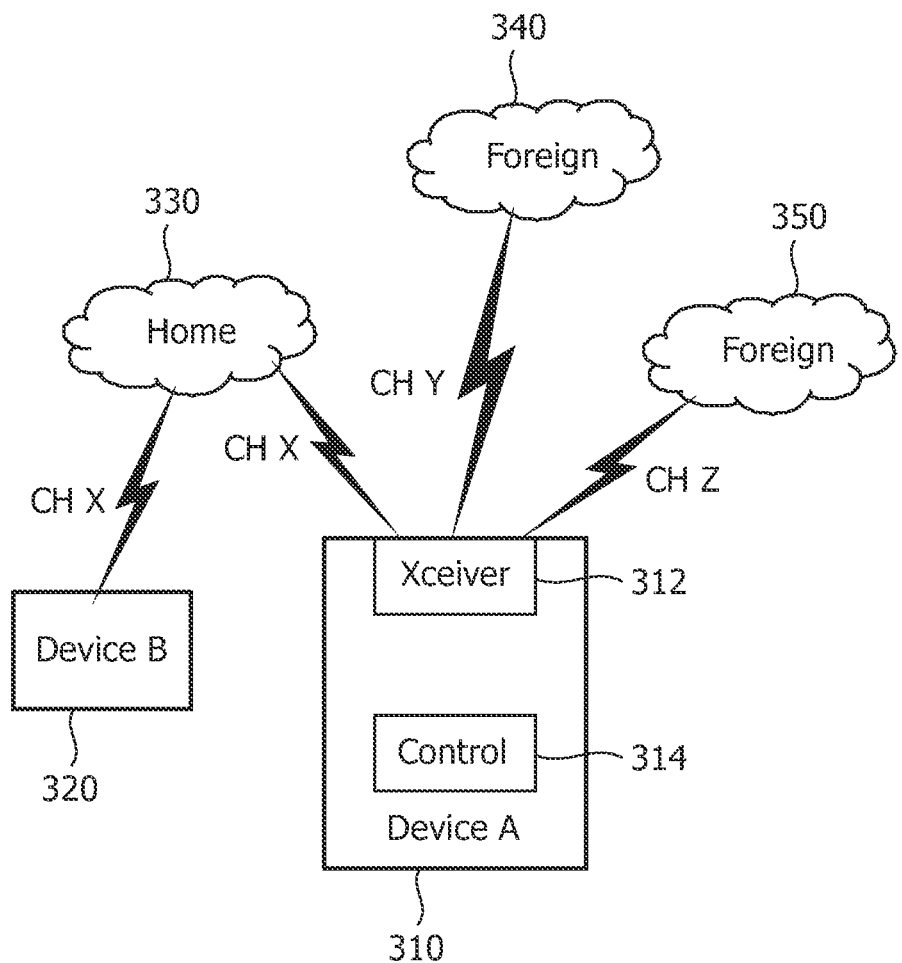
FIG. 3 illustrates an example block diagram of a multiple channel network in accordance with this invention.

FIG. 3 illustrates an example block diagram of a multiple-channel (X, Y, Z) network. Devices A 310 and B 320 are configured to routinely operate on a home channel 330 using, for example, a transceiver 312 that is tuned to channel X.

A controller 314 at device A 310 is configured to allow device A to operate as a proxy to foreign channels 340, 350 by tuning the transceiver 312 to channels Y and Z, respectively. As a proxy, device A 310 performs some or all of the functions described above. While device A 310 is acting as a proxy, device B 320 is configured as an anchor device to represent device A 310 at the home channel X 330, as discussed above. When device A 310 completes the data gathering or distributing proxy tasks on the selected channel(s) (Y and/or Z), the controller 314 retunes the transceiver 312 to channel X, and device A 310 rejoins the home channel X 330. Upon device A's return, device B 320 terminates its anchoring functions, and notifies device A 310 of any data collected on device A's behalf, as discussed above.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
 a) the word "comprising" does not exclude the presence of other elements or acts than those listed in a given claim;
 b) the word "a" or "an" preceding an element does not exclude the presence of a plurality of such elements;
 c) any reference signs in the claims do not limit their scope;
 d) several "means" may be represented by the same item or hardware or software implemented structure or function;
 e) each of the disclosed elements may be comprised of hardware portions (e.g., including discrete and integrated electronic circuitry), software portions (e.g., computer programming), and any combination thereof;
 f) hardware portions may be comprised of one or both of analog and digital portions;
 g) any of the disclosed devices or portions thereof may be combined together or separated into further portions unless specifically stated otherwise;
 h) no specific sequence of acts is intended to be required unless specifically indicated; and
 i) the term "plurality of" an element includes two or more of the claimed element, and does not imply any particular range of number of elements; that is, a plurality of elements can be as few as two elements.

The invention claimed is:

1. A method for communicating over wireless networks operating on different channels, comprising:
 communicating messages among a first plurality of devices on a home channel;
 communicating messages among a second plurality of devices on a foreign channel;
 transmitting status information associated with the home channel to the foreign channel via a proxy device of the first plurality of devices that is dispatched to the foreign channel, wherein the status information is communicated by the proxy device via a beacon signal during a beacon period of a superframe; and
 assigning an anchor device from among the first plurality of devices to handle traffic on the home channel which is directed to the dispatched proxy device while the dispatched proxy device is dispatched to the foreign channel.

2. The method of claim 1, further comprising transmitting status information associated with the foreign channel to the home channel via the proxy device when the proxy device returns to the home channel.

3. The method of claim 2, wherein the status information associated with the foreign channel includes timing information associated with the foreign channel.

4. The method of claim 1, further comprising communicating messages from one or more devices of the first plurality of devices to one or more devices of the second plurality of devices via the proxy device.

5. The method of claim 1, further comprising communicating messages from one or more devices of the second plurality of devices to one or more devices of the first plurality of devices via the proxy device.

6. The method of claim 1, wherein the status information identifies a destination device in the foreign channel for a message that is to be transmitted in a data period of the superframe by the proxy device.

7. The method of claim 1, wherein the beacon signal distinguishes the proxy device as being from a foreign channel.

8. The method of claim 1, further comprising reserving a proxy beacon slot for use by the proxy device and for use by other proxy devices from the home channel.

9. The method of claim 1, further comprising reserving a proxy beacon period for use by the proxy device, and for use by other proxy devices from other channels.

10. The method of claim 1, further comprising notifying devices on the home channel of a temporary absence of the proxy device from the home channel via the anchor device of the home channel.

11. The method of claim 1, wherein the status information includes an identification of each device of the first plurality of devices on the home channel.

12. A device for communicating over wireless networks operating on different channels, comprising:
   a transceiver for operating on a plurality of selectable channels; and
   a controller for controlling the transceiver, wherein the controller is configured to:
      operate the transceiver on a home channel to determine a status of the home channel;
      operate the transceiver on a foreign channel to communicate the status of the home channel to devices of the foreign channel via a beacon signal during a beacon period of a superframe; and
      assign another device which is operating on the home channel to handle traffic on the home channel which is directed to the transceiver while the transceiver is operating on the foreign channel.

13. The device of claim 12, wherein the transceiver is configured to communicate messages from devices of the home channel to devices of the foreign channel during a data period of the superframe.

14. A non-transitory computer-readable medium including instructions configured to cause a controller in a wireless device for communicating over wireless networks operating on different channels to:
   communicate with a first plurality of devices on a first channel;
   change to a second channel;
   assign another wireless device on the first channel to handle traffic on the first channel which is directed to the wireless device while the wireless device is on the second channel;
   communicate with a second plurality of devices on the second channel;
   transmit status information associated with devices on the first channel to devices on the second channel via the wireless device of the first plurality of devices that is dispatched to the second channel, wherein the status information is communicated by the wireless device via a beacon signal during a beacon period of a superframe;
   change to the first channel; and
   transmit status information associated with devices on the second channel to devices on the first channel.

* * * * *